United States Patent

[11] 3,627,372

[72] Inventors E. Robert Carpenter
 Brookfield;
 Eugene J. Kielb, Waukesha, both of Wis.
[21] Appl. No. 883,120
[22] Filed Dec. 8, 1969
[45] Patented Dec. 14, 1971
[73] Assignee Hydraulic Machinery Company, Inc.
 Milwaukee, Wis.

[54] CONTINUOUS ROTATION GRAPPLE
 15 Claims, 2 Drawing Figs.
[52] U.S. Cl..................................................... 294/88,
 294/106
[51] Int. Cl....................................................... B66c 13/14
[50] Field of Search............................................ 294/85, 88,
 106

[56] References Cited
 UNITED STATES PATENTS
 344,222 6/1886 Thomas........................ 294/88 X
 423,548 3/1890 Boyer........................... 294/88 X
 1,518,560 12/1924 Carroll.......................... 294/106 X
 2,018,511 10/1935 Connelly....................... 294/115 X
 2,061,864 11/1936 Wells............................ 294/88 X
 3,527,495 9/1970 Maradyn....................... 294/88
 FOREIGN PATENTS
 821,984 9/1969 Canada......................... 294/106
 1,423,089 11/1964 France.......................... 294/106
 938,985 2/1956 Germany...................... 294/106

Primary Examiner—Richard E. Aegerter
Assistant Examiner—W. Scott Carson
Attorney—Hume, Clement, Hume & Lee ABSTRACT: A hydraulically powered material-handling device wherein rotation and/or clamping are required. Clamping force is provided down the centerline of rotation, allowing continuous rotation without the use of a swivel. This is accomplished by placing the motor or speed changer output shaft on the same centerline as the clamping cylinder. Also, all hydraulic connections are stationary, avoiding the winding of hoses around the clamping device during rotation.

PATENTED DEC 14 1971 3,627,372
Fig. 1.
Fig. 2.
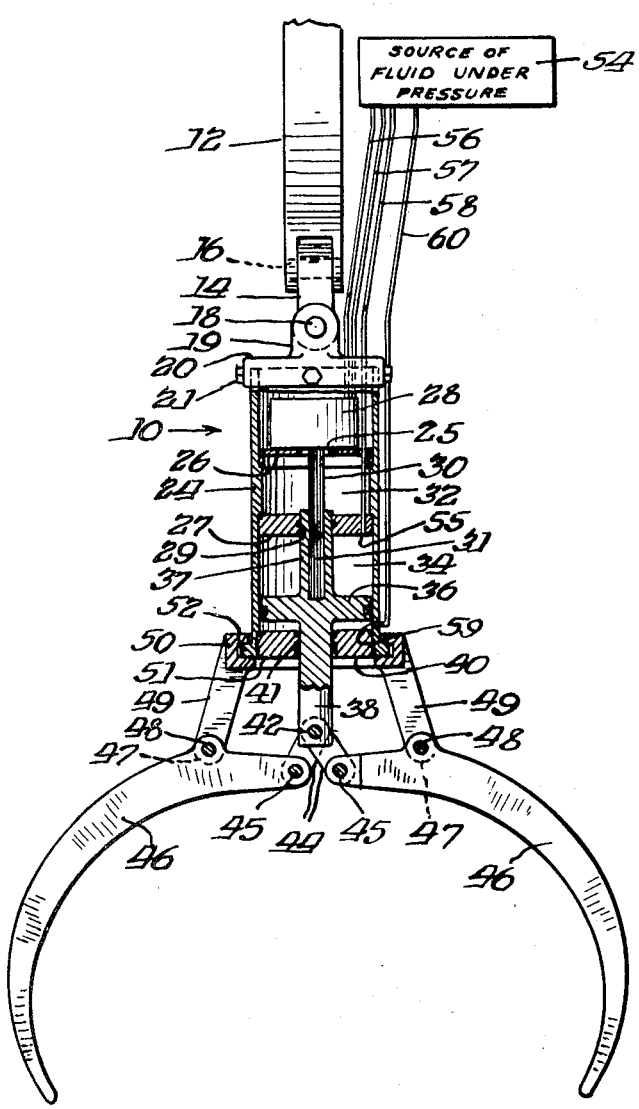
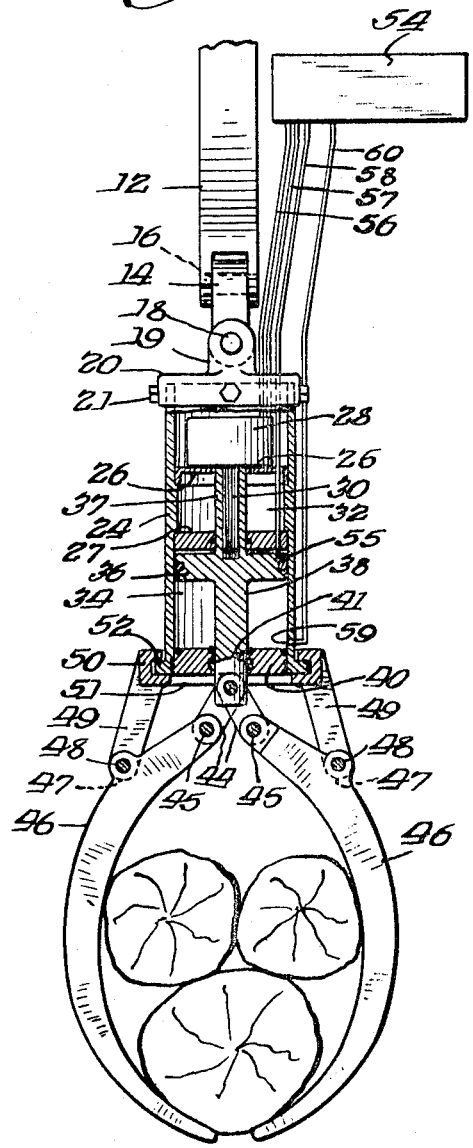
Inventors.
Elmer Robert Carpenter &
Eugene J. Kielb.
By Hume, Clement, Hume & Lee.
Attys.

CONTINUOUS ROTATION GRAPPLE

This invention pertains to an improved material-handling device, such as a log grapple, where continuous rotation and/or clamping are required.

Previous material-handling devices provide continuous rotation, but the hoses through which power is transmitted to the prime mover and to the clamping cylinders wind around the grappling device when 360° rotation is accomplished. Such devices are bulky, awkward, slow and costly.

Another version of such material-handling devices provides a motor mounted to a stationary member, whereby continuous rotation is accomplished through gears or chains. A swivel is then provided to transmit power to the clamping cylinders.

It is an object of the present invention to provide a material-handling device which allows continuous rotation without the use of a swivel or winding hoses.

It is further an object of this invention to provide a hydraulically powered material-handling device comprising stationary hydraulic connections wherein all hoses or conduits need only flex enough to accommodate a mechanical universal support mechanism.

Another object of the present invention is to apply a clamping force down the centerline of rotation in a material-handling device by placing the output shaft of the power source on the same centerline as the clamping cylinder.

It is further an object of the present invention to effect a transfer of power through a slip coupling in a material-handling device to protect the source of power and further reduce the size and weight of the device.

The grappling device herein described provides a compact, efficient, rapid and inexpensive device for handling materials which must be picked up and transferred to another location, such as to a truck or railroad car.

In the drawings:

FIG. 1 is a perspective view of the material-handling device in its open position, with a cutaway view of the clamping cylinder and clamping means support bearing;

FIG. 2 is a perspective view similar to FIG. 1 with the clamping tongs of the material-handling device in a closed position.

Referring now to FIGS. 1 and 2 of the drawings, the material-handling device comprises a clamping cylinder housing generally designated by the numeral 10 which is supported from a suitable hoistable crane boom member 12 by means of a mechanical universal support mechanism. Said universal support mechanism comprises a strut member 14 which is rotatably fixed to boom 12 by means of pivot pin 16. A second pivot pin 18, located perpendicular to pivot pin 16, pivotally connects strut 14 to extension 19 of cap member 20.

Cap member 20 is affixed to clamping cylinder housing 10 by any suitable means, such as bolts 21. Clamping cylinder housing 10 comprises a cylinder casing 24, to which is rigidly fixed a stationary mounting member 26. A power source, shown as hydraulic motor 28 is seated on mounting member 26. Power source 28 may or may not be directly connected to a gear reduction unit, which could also be mounted on member 26, depending upon the particular power source and speeds desired. An opening 25 is provided in mounting member 26 through which vertically splined output shaft 30 extends. Said output shaft 30 is rotatably driven by power source 28, or any suitable gear reduction drive as aforementioned.

The central portion of cylinder casing 24 defines a chamber 32 through which output shaft 30 extends. The lower portion of cylinder casing 24 defines a cylinder chamber 34. Said cylinder chamber 34 is formed by a second stationary member 27 secured in casing 24 and lower cap member 40 removably affixed to the bottom extremity of casing 24. Both stationary member 27 and cap member 40 are secured to casing 24 so as to provide a fluidtight cylinder chamber 34.

Slidably mounted in cylinder chamber 34 is piston 36. Integral with piston 36 are first and second shafts 37 and 38 at the upper and lower extremities of piston 36, respectively.

Shaft 37 extends axially through an opening 29 in stationary member 27, while shaft 38 extends axially through an opening 41 in lower cap member 40. Both openings 29 and 41 are provided with sealing means to prevent the escape of hydraulic fluid from cylinder chamber 34.

Throughout the length of shaft 37 is a central bore which comprises internal splines 31. Said internal splines 31 mate with complementary splines on output shaft 30 to form a slip coupling between output shaft 30 of the motor 28 and piston shaft 37 for a purpose to be explained. It is apparent from FIGS. 1 and 2 that a rotative force applied to output shaft 30 will also rotatably drive shafts 37, 38 and piston 36 through said splined connection, and also that said splined connection will simultaneously permit shaft 37 to move axially along the length of output shaft 30.

Affixed to the lower portion of shaft 38 is pin 42 from which clamping links 44 pivotally extend. At the opposite ends of clamping links 44, pins 45 pivotally connect said clamping links to clamping tongs 46. Pins 48 extend through portions 47 provided on clamping tongs 46 and bearing links 49 connect clamping tongs 46, through pins 48, to a rotatably bearing member 50. Said bearing member 50 is rotatably supported by a bearing surface extension 52 of the lower portion of casing 24. Suitable means are provided between bearing surface extension 52 and bearing member 50 to insure a substantially frictionless rotatable connection therebetween. Bearing member 50 comprises a hollow portion 51 through which shaft 38 extends. As will be further explained, bearing member 50 enables clamping tongs 46 and piston 36 to rotate with respect to casing 24 of clamping cylinder housing 10.

In order to control the functions of the material-handling device comprising the present invention, a source 54 of fluid under pressure is provided which can be maintained on the vehicle or apparatus supporting boom member 12. First and second conduit means 56, 57 transmit fluid under pressure between source 54 and hydraulically powered motor 28 to control the rotative force and direction applied to output shaft 30. A third conduit means 58 is provided to convey fluid under pressure from source 54 through port 55 in stationary member 27 to the portion of chamber 34 above piston 36. As shown in FIG. 1, fluid under pressure entering port 55 will move piston 36 in a downward direction, for purposes to be more fully described.

A fourth conduit 60 is provided to transmit fluid under pressure from source 54 to port 59 located in the lower portion of casing 24. Fluid under pressure enters chamber 34 through port 59 below piston 36 and forces piston 36 to move in an upward direction, as will be explained. It is thus apparent that axial movement of piston 36 in chamber 34 is dependent upon fluid under pressure entering chamber 34 from either port 55 or port 59. Source 54 of fluid pressure comprises suitable control means to selectively direct fluid alternatively to ports 55 or 59, and also comprises means to selectively control the fluid pressure necessary to operate hydraulic motor 28.

It is apparent that the conduits 56, 57, 58 and 60 need only be long enough to extend from the source 54 of fluid pressure to cylinder casing 24, allowing only enough flexibility to permit said device to pivot about the universal support mechanism formed by strut 14 and pivots 16 and 18. Thus, the need for dangling hoses and the possibility of winding these hoses about the grappling mechanism is eliminated.

The operation of the present invention is as follows: Boom 12 positions clamping cylinder housing 10 above the material to be moved, for example, the logs shown in FIG. 2, such that clamping tongs 46 extend around said material. To assume a correct clamping position over the material, it may be necessary to rotate the clamping tongs 46 about the central axis of clamping cylinder housing 10. This rotation is accomplished by transmitting fluid under pressure from source 54 via conduit 56 (or 57 depending on the rotative direction desired) to actuate fluid motor 28. Said fluid motor drives splined output shaft 30, which in turn rotates shaft 37, piston 36, and shaft 38. This rotative force is transferred to clamping tongs 46 by means of clamping links 44 connecting said clamping tongs to shaft 38.

Bearing means 50, connected to clamping cylinder housing 10 and clamping tongs 46, provides for rotation of clamping tongs 46 about the central axis of housing 10. Bearing links 49 connect clamping tongs 46 to bearing 50 by means of pins 48. Said bearing 50 is rotatably mounted on bearing surface extension 52 of cylinder casing 24 which serves as a bearing surface. As fluid motor 28 rotates shaft 38 and clamping tongs 46, bearing member 50 rotates with clamping tongs 46 while adequately supporting the grappling mechanism. It can be appreciated that the bearing means just described allows continuous rotation of clamping tongs 46 through 360°, while the absence of conduits or hoses in the region of the rotating portion negates the possibility of tangling the lines carrying control fluid to the device.

Upon satisfactorily positioning clamping tongs 46, as shown in the open position in FIG. 1, over the material to be transported, the device is next operative to close the clamping tongs around the material, as shown in the lower portion of FIG. 2. To accomplish this, fluid under pressure is suitably transmitted from source 54 through conduit 60 to port 57 and into the lower portion of chamber 34. Fluid pressure in chamber 34 acts on the underside of piston 36 to move said piston upward. Any fluid remaining in the portion of cylinder chamber 34 above piston 36 is forced into conduit 58 and returned to source 54. Shaft 37, which is integral with piston 36, also moves in an upward direction along splined shaft 30. The splined connection between shafts 30 and 37 maintains the driving connection between said shafts as the axial position of piston 36 changes relative to shaft 30. This splined connection enables fluid motor 28 to rotate clamping tongs 46 about a central axis irrespective of the vertical position of piston 36.

As piston 36 moves upward in chamber 34, shaft 38 and clamping links 44 also move upward. This causes clamping tongs 46 to pivot about pins 48 on bearing struts 49, forcing the lower portions of clamping tongs 46 to move inward and grasp the material to be transported as shown in FIG. 2. Since output shaft 38 is located on the center line of clamping cylinder housing 10, the resulting force transmitted to clamping tongs 46 is applied along a central axis, thereby evenly distributing the load acting on said grappling device about a vertical axis. The entire mechanism, including clamping cylinder housing 10, clamping tongs 46, and the material grasped by said tongs can be moved to any desired location by means of crane boom 12.

Once the material has been moved by boom 12 to its desired location, such as over the bed of a railroad flatcar or the rear of a truck, for example, fluid motor 28 may be activated as described previously to rotate clamping tongs 46 to properly position said material over its intended supporting surface. To release the material from the grappling device, fluid under pressure is permitted to pass into conduit 58 to port 55 in stationary member 27 where it flows into cylinder chamber 34 and applies a downward force on the upper portion of piston 36. Under the influence of said fluid pressure, piston 36 and shaft 38 move in a downward direction. The downward movement of shaft 38, acting through clamping links 44, forces clamping tongs 46 to pivot outwardly about pins 48 until the material is released and the grappling device has assumed the position shown in FIG. 1.

Having thus described the invention, what is claimed is:

1. A material-handling device supported by a movable boom member comprising:
   a cylinder casing;
   support means connecting said cylinder casing to said boom member;
   rotatable clamping means supported by said cylinder casing movable between a first position and a second position;
   cylinder means in said cylinder casing;
   piston means movable in said cylinder means and operably connected to said clamping means to move said clamping means between said first and second positions and to rotate said clamping means about the central axis of said casing;
   fluid means for selectively transmitting fluid under pressure to said cylinder for operating on said piston means whereby said piston moves in response to the application of said fluid pressure to move said clamping means between said first and second positions;
   stationary support means in said cylinder casing;
   a power source mounted on said stationary support means and drivingly connected to said piston means for rotating said piston means and said clamping means about said central axis.

2. A material-handling device according to claim 1 wherein: said fluid means comprises a source of fluid under pressure and conduit means connected to a portion of said cylinder casing and in communication with said cylinder.

3. A material-handling device according to claim 1 wherein: said power source is hydraulically operated and controlled.

4. A material-handling device according to claim 1 wherein: said support means connecting said cylinder casing to said boom member comprises a universal support device permitting said cylinder casing to move in any direction relative to said boom member.

5. A material-handling device according to claim 1 wherein: said clamping means are continuously rotatable through 360° about the central axis of said cylinder casing.

6. A material-handling device according to claim 1 wherein: said piston means is operably connected to said clamping means and to said power source along the central axis of rotation of said piston means, said clamping means, and said power source.

7. A material-handling device according to claim 1 wherein: said power source includes an output shaft drivingly connected by means of a slip coupling to said piston means along the central axis of said cylinder case.

8. A material-handling device supported by a movable boom member comprising:
   a cylinder casing;
   universal support means pivotally connecting said cylinder casing to said boom member;
   a stationary support member in said cylinder casing;
   clamping means supported by said cylinder casing and rotatable about a central axis;
   cylinder means defined by a portion of said cylinder casing;
   piston means movable in said cylinder means and operably connected to said clamping means to move said clamping means from a first position to a second position and to rotate said clamping means about the central axis of said casing;
   a power source mounted on said stationary support member drivingly connected to said piston means for rotating said piston means and said clamping means about said central axis of said cylinder casing;
   conduit means for transmitting fluid under pressure from a source of fluid pressure to said cylinder whereby said piston moves said clamping means between said first position and said second position in response to the application of said fluid pressure;
   said conduit means connected to a stationary portion of said cylinder casing.

9. A hydraulically powered material-handling device supported by a movable boom member comprising;
   a stationary cylinder casing;
   universal support means pivotally connecting said cylinder casing to said boom member permitting pivotal movement of said cylinder casing in all directions relative to said boom member;
   clamping means movable from a first open position to a second substantially closed position and supported by said cylinder casing;
   said clamping means being rotatably supported by said cylinder casing;

an internal portion of said cylinder casing defining cylinder means;

piston means axially movable in said cylinder means;

said piston means comprising first and second shaft portions integral therewith and located along the central axis of said piston means;

a stationary support member in said cylinder casing;

hydraulically operated and controlled power source means centrally mounted on said stationary support member including an output shaft;

said output shaft slideably connected to said first shaft means and operable to rotate said first and second shaft means and said piston means about the central axis of said cylinder casing;

said second shaft means operably connected to said clamping means whereby axial movement of said piston along the central axis of said piston means moves said clamping means between said first and second positions and axial movement of said piston means about its central axis rotates said clamping means about said central axis of said casing;

a source of fluid under pressure;

conduit means connected between said source of fluid pressure and said cylinder means to selectively transmit fluid under pressure to said cylinder means whereby said piston is operable to move said clamping means between said first and said second positions in response to the application of said fluid pressure.

10. A material-handling device according to claim 9 wherein:

said clamping means rotates about the central axis of said cylinder casing through 360°.

11. A material-handling device according to claim 9 wherein:

said first and second shaft portions of said piston rotate about the central axis of said cylinder casing causing the clamping force moving said clamping means between said first and said second positions to be applied along the central axis of said cylinder casing.

12. A material-handling device according to claim 9 wherein said output shaft is located on the central axis of said cylinder casing.

13. A material-handling device according to claim 9 wherein:

a slip coupling drivingly connects said first shaft portion to said output shaft.

14. A material-handling device according to claim 12 wherein:

said slip coupling is formed by mating splined portions of said first shaft portion and said output shaft.

15. A material-handling device according to claim 9 wherein:

bearing means are provided between said cylinder casing and said clamping means to provide continuous, substantially friction-free rotation of said clamping means relative to said cylinder casing.

* * * * *